May 14, 1929.    J. G. SUTHERLAND    1,712,590
TIRE COVER
Filed March 6, 1923    2 Sheets-Sheet 2

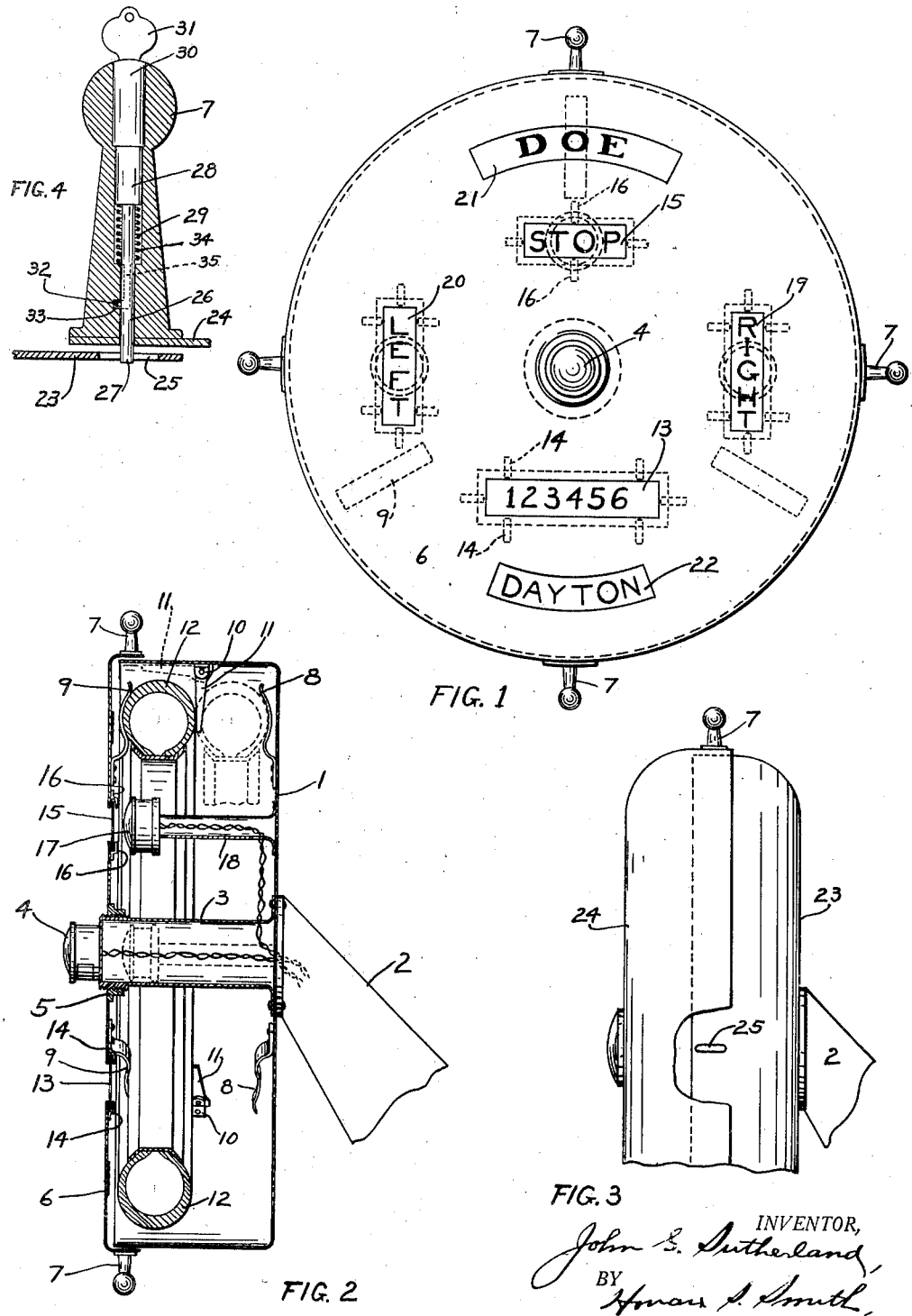

INVENTOR,
John G. Sutherland
BY
ATTORNEY.

Patented May 14, 1929.

1,712,590

UNITED STATES PATENT OFFICE.

JOHN G. SUTHERLAND, OF OAKWOOD, OHIO.

TIRE COVER.

Application filed March 6, 1923. Serial No. 623,292.

This invention relates to new and useful improvements in tire covers, and more particularly to a tire cover made up of two enclosing members, the inner one of which is secured to the rear end of an automobile to receive and support a tire or tires and a liquid fuel tank or other container which is encompassed by the latter. The outer one of these members is adapted to be readily screwed or otherwise applied to the inner one to close it.

The conservation of space is one of the important problems presented to the automobile designer. Facility in mounting tires upon a tire carrier, and in removing them therefrom, as well as freedom from contact with dirt and oil when doing this work, are other problems which confront him.

My invention has for its purpose the conservation of space by mounting the liquid fuel tank or other container in an enclosing member which is secured to the rear end of an automobile, with provision for slipping one or more tires over said tank for support in said member, and there after screwing or otherwise applying to the latter a flanged cover portion to close it and to display through openings therein various lights, the license number, the name of the car and other legends.

My improved tire cover is simple, compact and attractive; in its provision for enclosing a liquid fuel tank or other container, it conserves space; and by its screw-threaded means for connecting the outer to the inner member, it reduces to an easy and clean operation, the task of inserting a tire in it, or of removing a tire therefrom.

Other important and incidental objects will be brought out in the following specification and particularly set forth in the subjoined claims.

Figure 5:
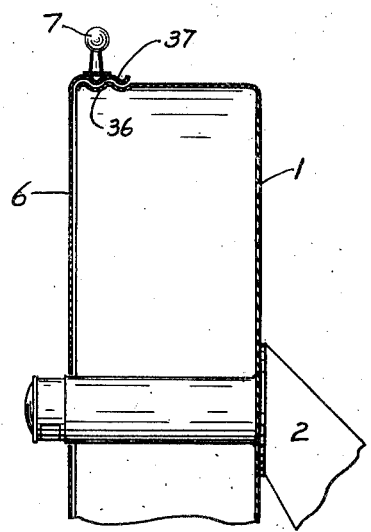
Figure 6:
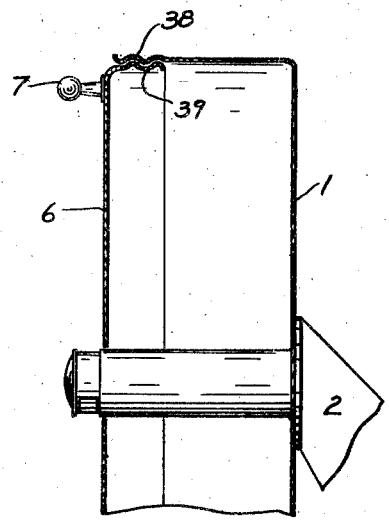
Figure 7:
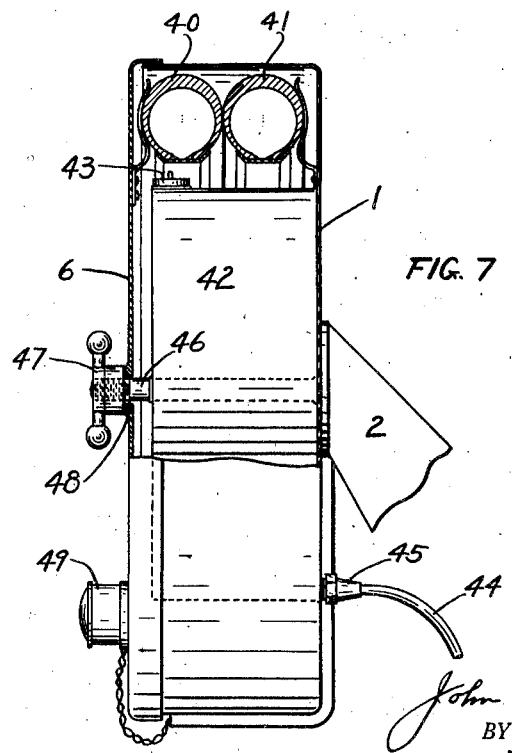

In the accompanying drawings illustrating the various forms of embodiment of my invention, Figure 1 is a rear view of my improved tire cover. Figure 2 is a longitudinal sectional view of one form of embodiment of my tire cover, showing a tire mounted therein and the outline of another in dotted lines. Figure 3 is a partial side view of a different shaped tire cover, partly broken away to disclose the slot which receives the locking pin. Figure 4 is a longitudinal sectional view taken through one of the handles on the tire cover, showing the locking means contained within it. Figure 5 is a longitudinal sectional view taken through the upper portion of a tire cover, the inner and outer members of which are respectively externally and internally screw-threaded along their free edges for connection to each other. Figure 6 is a longitudinal sectional view taken through the upper portion of a tire cover, the inner and outer members of which are respectively internally and externally threaded along their free edges for connection to each other. And Figure 7 is a longitudinal sectional view taken through my improved tire cover, showing a liquid fuel tank encompassed by two tires therein.

Throughout the specification and drawings, similar reference characters denote corresponding parts.

Referring to Figures 1 and 2 of the drawings for a detailed description of the form of embodiment of my tire cover illustrated therein, the numeral 1 designates an enclosing member which is preferably of cup shape and which is stamped or otherwise formed from sheet steel or other suitable material. This member may be easily secured to the rear end of an automobile (not shown) by means of a bracket 2.

Riveted or otherwise suitably secured to the middle part of the member 1, is a rearwardly projecting tube 3 which extends a short distance beyond the open end of said member to support an electric tail lamp 4. (See Figures 1 and 2.) The front end of this tube is externally threaded to receive the internally threaded hub portion 5 of a cupped or flanged closure member 6 which is preferably stamped from sheet steel or other suitable material.

Radially secured to the periphery of the inwardly turned flange portion of the closure member 6, is a series of handles 7 that are preferably four in number to permit the closure member to be easily turned for the purpose of screwing it onto, or off of, the threaded end of the tube 3. These handles 7 make it possible to easily apply the closure member to, or remove it from, the member 1 without contact with the grease and dirt that usually adhere to a tire cover.

One or two tires may be inserted in the enclosing member 1 for support by the following means. Referring to Figure 2, there is suitably secured to the rear inside portion of the member 1, a series of spring bracket pieces 8 which are preferably three in number and which are curved to conform to the curved periphery of an automobile tire. A like number of spring bracket pieces 9, similar and oppositely disposed to the bracket pieces 8, are secured to the inside front portion of the closure member 6. (See Figure 2.)

Pivotally secured to a support 10 that depends from the middle inside top portion of the member 1, is an arm 11 having a relatively flat upper end which, when the arm is turned downwardly, will tightly engage the top of said member to make the arm a partition stop piece against which a tire 12 may be pressed by the spring bracket pieces 9 when the closure member 6 is screwed onto the tube 3. Being firmly gripped between the spring bracket pieces 9 and the arm 11, the tire 12 will be so supported within the tire cover that it will not rattle when the automobile is in motion. (See Figure 2.)

When it is desired to support two tires within the member 1, the arm 11 is turned upwardly to the position shown for it in dotted lines in Figure 2. The rear tire, also shown in dotted lines in said figure, is then free to be pressed against the spring bracket pieces 8 by the outer tire which is engaged by the bracket pieces 9, both tires being thereby firmly supported within the cover.

Provided in the closure member 6 below the lamp 4, is an elongated horizontal opening through which there is displayed a license plate 13 that is supported between two bracket pieces 14, the latter being secured to the inside of the closure member, one above, and the other below, said opening. (See Figures 1 and 2.)

Above the lamp 4 the closure member 6 contains a horizontal opening through which there is displayed the word Stop on a transparent plate 15 mounted between bracket pieces 16, 16 on the inside portion of the closure member, one above, and the other below, said opening. This plate is illuminated by an electric lamp 17 carried by the front end of a tube 18 that is suitably secured to the rear part of the cupped member 1. (See Figure 2.) When it is desired to stop the automobile, the lamp 17 may be illuminated to cause the word Stop to glow through said opening.

Provided on each side of the lamp 4 in the closure member 6 is a vertical opening, the one on the right revealing the word Right displayed on a transparent plate 19 suitably secured to the inside part of said member; and the one on the left revealing the word Left displayed by a transparent plate 20 suitably secured to the inside part of said closure member. These plates may be alternately illuminated by electric lamps shown in dotted lines in Figure 1, to indicate whether the automobile is going to turn to the right or to the left.

The closure member 1 contains in its top outside portion a segmental depression 21 to receive the name of the automobile, it being in this instance the name Doe. In its extreme lower outside portion there is a segmental depression 22 to receive the name of the city in which the car owner lives, it being in this instance the word Dayton. However, any other name or legend may be displayed in this depression. (See Figure 1.)

It will thus be seen that my improved tire cover not only easily receives, and firmly supports, one or more tires, but in its provision for displaying the name of the car, the license plate and other legends and signs, it conserves space. It also presents to view all of these signs in a uniform and attractive manner, thereby taking the place of many separate boxes and supports which, when hung haphazardly on the rear end of a car, rattle and jingle and present a ragged and unseemly appearance.

For the purpose of locking the closure member 6 to the cupped member 1 after it has been applied to the latter, the following described means are preferred, although any other suitable means may be employed for this purpose if desired. Referring to Figures 3 and 4, there is shown a cupped member 23 which has a curved rear end and which contains near its front edge below one of the handles 7 in the closure member 24, a horizontal slot 25. The handle 7 above this slot contains in its inner end an axial bore 26 in which there is movable a lock pin 27 which terminates at its outer end in an enlarged shoulder portion 28 that is free to move in a counterbore 29 in said handle.

At its extreme outer end the lock pin 27 has a key-receiving portion 30 adapted to receive a Yale or like key 31 by which the lock pin may be forced through a hole in the closure member 24 into the slot 25 in the member 23 to lock the closure member to the latter. After the pin 27 has been forced into the slot 25, it may be turned by the key 31 to force a lug 32 on the pin into a recess 33 in the handle, to hold the pin in the slot. Surrounding the upper end of the pin 27 in the counterbore 29 is a spring 34 which, when the pin is forced inwardly by the key, will be compressed between the shoulder 28 on the pin and the shoulder formed in the handle at the lower end of the counterbore. Now, when it is desired to remove the pin 27 from the slot 25 and thereby unlock the separable members 23 and 24 of the tire cover, the key 31 is turned a sufficient distance to withdraw the lug 32 from the recess 33, whereupon the compressed spring, by virtue of the pressure which it exerts upon the shoulder 28 of the pin, will withdraw the pin 26 from the slot 25. The recess 33 communicates with an elongated groove 35 indicated by dotted lines in Figure 4, to permit the lug 32 to be turned into it for longitudinal movement therethrough when the pin 27 is drawn from the slot 25 by the spring or moved into it by the key.

In Figure 5 there is shown a modified form of my tire cover in that the cupped member 1 has an externally threaded outer end 36 to receive the internally threaded end 37 of the closure member 6 to permit the latter to be easily screwed on the former. The cupped member 1 shown in Figure 6 has an internally threaded end portion 38 to permit the externally threaded end portion 39 of the closure member 6 to be screwed onto it by handles 7 which project outwardly from the front portion of the closure member near its outer edge, one of said handles being shown in Figure 6.

One of the most important features of my invention is the provision that is made within the tire cover for the support of a liquid fuel tank or other container. Suitably secured to the rear end of the cupped member 1 shown in Figure 7, within the space encompassed by two tires 40 and 41, is a liquid fuel tank 42 having a top inlet opening that is closed by a cap 43. From this tank the liquid fuel flows to the front part of the car through a tube 44 that is secured to the tank by a union 45.

Projecting through the middle portion of the tank 42 from the rear end of the cupped member 1, to which it is suitably secured, is an elongated connecting member 46 whose outer end is externally threaded to receive a handle screw 47 or like device. The closure member 6 has a central opening 48 to permit the member 46 to project through it a sufficient distance to receive the handle screw 47, whereby, when the latter is turned to the right, it will press the closure member 6 tightly against the member 1 to close the tire cover containing the liquid fuel tank and the tires.

Secured to the lower outside portion of the closure member 6 in Figure 7, is an electric tail lamp 49 which may be secured thereon in any other location if desired.

It will thus be seen that by mounting the liquid fuel tank 42 within the tire cover, the space where it is ordinarily located will be conserved. Furthermore, this tank will have sufficient capacity to act as a main supply container, or it may be employed as an auxiliary tank if desired. The tires 40 and 41 may be easily slipped over this tank for support within the tire cover, and when the latter is sealed by the closure member 6, it will present an attractive and compact appearance in sharp contrast to the unsightly and irregular one exhibited by the separate mounting of a tire carrier, license plate, signal boxes and other devices on the back of an automobile.

I do not wish to be limited to the details of construction and arrangement herein shown and described, and any changes or modifications may be made therein within the scope of the subjoined claims.

Having described my invention, I claim:

1. A tire cover comprising an enclosing member, a flanged closure member therefor, spring bracket pieces mounted on the inside portions of the enclosing and closure members, and a pivoted stop member within the enclosing member for gripping the sides of the tire between them.

2. A tire cover comprising a cup-shaped enclosure member, a flanged closure member therefor, spring tire-gripping bracket pieces mounted on the inside portion of the closure member, and a stop arm pivotally secured to the inside portion of the annular rim of the enclosing member for the purpose specified.

In testimony whereof I have hereunto set my hand this 5th day of March, 1923.

JOHN G. SUTHERLAND.